K. G. WILLIAMS.
SINK REFUSE STRAINER.
APPLICATION FILED FEB. 11, 1916.
1,235,269.
Patented July 31, 1917.
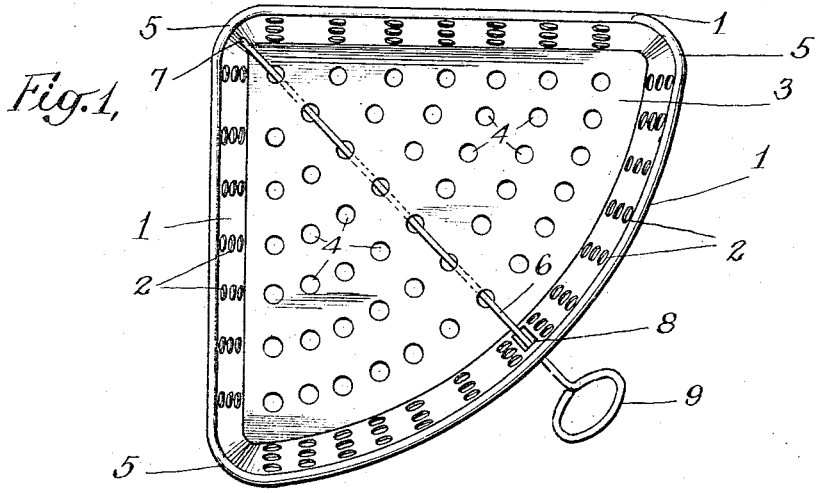
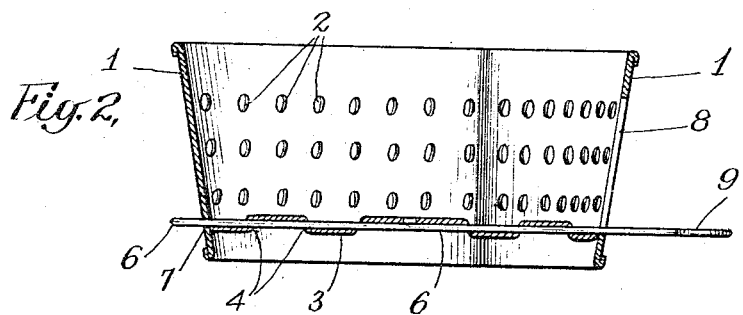
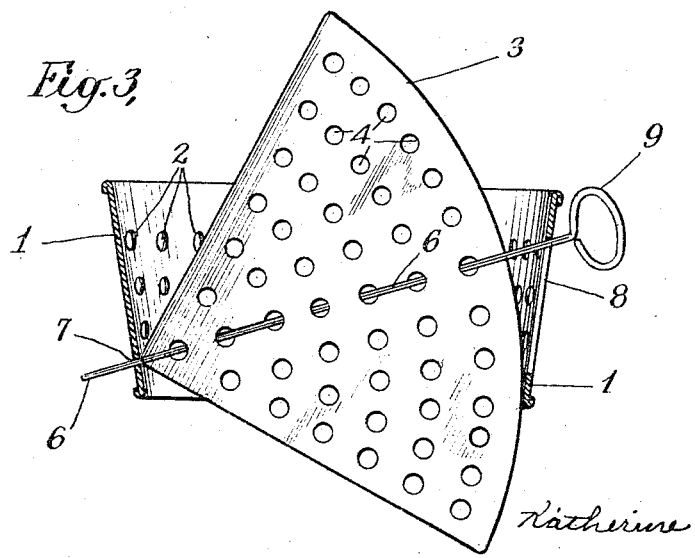
INVENTOR
Katherine G. Williams

UNITED STATES PATENT OFFICE.

KATHERINE G. WILLIAMS, OF NEW YORK, N. Y.

SINK REFUSE-STRAINER.

1,235,269.  Specification of Letters Patent.  Patented July 31, 1917.

Application filed February 11, 1916. Serial No. 77,742.

*To all whom it may concern:*

Be it known that I, KATHERINE G. WILLIAMS, a citizen of the United States, residing in New York city, county and State of New York, have invented certain new and useful Improvements in Sink Refuse-Strainers, of which the following is such a full, clear, and exact description as will enable any one skilled in the art to which it appertains to make and use the same.

My invention relates to refuse strainers used in connection with kitchen sinks, and which are usually portable and are either suspended from one side of the sink or placed on the bottom thereof. After the ordinary strainer has been used to strain the waste food scraped from plates and dishes, the strainer has to be inverted to eject its contents and it is generally knocked against the edge of the garbage pail to dislodge the refuse from the bottom of the strainer, and this blow in course of time proves destructive of the device. This operation also necessitates scraping of the strainer, sides and bottom, and taken altogether the operation is open to the objection that it is a very messy one. My invention seeks to overcome the above stated drawbacks, and the improvement consists principally in having the bottom of the strainer so constructed that it can be rotated and thereby dump its contents by a quick and clean operation, without necessitating inverting the strainer or knocking it against an object. There are other details of the invention which will be hereinafter fully set forth and then pointed out in the claims.

I have illustrated a type of my invention in the accompanying drawings, wherein:—

Figure 1, is a top plan view of my improved device with the bottom in normal closed position.

Fig. 2, is a vertical sectional view of the device with the bottom in normal horizontal position, the same as in Fig. 1. The plane of this section is taken through the operating shaft.

Fig. 3, is a similar view to that shown in Fig. 2, but with the bottom tipped up at one side and tilted halfway on its pivotal axis in position to dump its load.

Referring to the drawing in which like numbers of reference designate like parts throughout, the strainer vessel comprises sides 1, having perforations 2 therein, and a rotatable bottom 3, provided with perforations 4. The shape of the strainer herein shown is in plan view that of a sector, the arc of which is a quarter of a circle, though of course the device may be made in any desired shape. This shape permits of the strainer being placed snugly in the corner of the sink. The corners are each rounded, as at 5, and this prevents the refuse from lodging at these points. The respective sides of the strainer slope downwardly and inwardly so that the interior walls converge downwardly and thereby afford sufficient frictional support to edges of the tilting bottom 3, to maintain the same in horizontal position with its load thereon, as will be readily understood from the drawings, wherein the bottom in its normal horizontal position lies quite a distance above the lower edges of the sides of the receptacle. This is one of the important features of the invention, and by virtue of which the bottom when lowered adjusts itself in normal position and then retains such position, since the opening is smaller than the bottom 3.

The bottom 3, is provided with a rotary shaft 6, which is secured thereto in central position and extends from the apex of the sector across the center of the arc, the inner end of the shaft being loosely mounted in a hole 7, in the rounded corner of the side 1, while the outer end extends loosely through a vertical slot 8, formed in the opposite side of the strainer. The outer end of the shaft projects well beyond the side and upon the exterior thereof is provided with a suitable handle 9, for conveniently lifting the outer end of the shaft in its slot and turning the shaft on its bearings as indicated in Fig. 3. I show a simple way of attaching the shaft to the bottom 3, by passing the shaft through certain of the perforations therein so that portions of the shaft lie upon either side of the bottom and thereby binds the shaft in fixed position. By rotating the shaft, the bottom may be turned at any angle throughout the circle. It will be noted that by reason of the end of the shaft 6, having a considerable range of movement throughout the length of the guide-slot 8, the bottom is free to swing on the end of the shaft which has a bearing in the hole 7, in the side of the strainer. If the strainer is turned upsidedown, the bottom will swing throughout the length of the guide-slot and the end of the slot will check this movement and bring it to a sudden stop.

From the foregoing, the operation of my improved strainer will be readily understood. The refuse is thrown into the strainer with the bottom in horizontal position, as shown in Figs. 1 and 2, whereupon the operator grasps the handle 9 of the shaft, and lifts it so as to tip the bottom and cause it to clean the converging side walls. The shaft is turned so as to tilt the bottom into vertical position as shown in Fig. 3, or so as to invert the bottom, and the solid matter resting upon the bottom will drop therefrom into the receptacle which may be placed beneath it. By turning the bottom upside down, any small particles of refuse adhering thereto may be quickly removed by applying a little water to the inverted bottom, and the strainer is then ready for use again. The strainer may also be operated to remove the refuse therefrom and dump it, by suddenly turning it upside-down so that the edge of the bottom near the slot in the side will be free to fall the length of the guide-slot and thereby jar the refuse from the surface of the bottom. It will also be noted that since the swinging bottom is free to tip on one part thereof so as to permit the opposite edge to have a limited play within the strainer, when the device is inverted the bottom will automatically fall at one edge and when it is checked in its falling movement the blow will jar the refuse from the bottom and discharge it.

Instead of having the device made of perforated sheet metal, as shown, it may be made of any suitable perforated or reticulated material, such for example as wire netting or gauze.

I wish to be understood as not limiting my invention to the particular construction of the parts herein shown, as it is evident that various modifications may be made in the different parts thereof without, however, departing from the spirit of the invention.

Having thus described my invention, what I claim and desire to secure by Letters Patent is:—

1. A sink refuse strainer having downwardly converging interior side walls, a pivoted bottom fitting within said walls with sufficient friction to maintain said bottom with its load in horizontal position, and means for turning said bottom to dump its load.

2. A sink refuse strainer having downwardly converging interior side walls, a pivoted bottom pivoted in opposite walls of the strainer, and means for raising one of said pivotal points of the bottom and then turning it on its pivotal axis.

3. A sink refuse strainer having downwardly converging interior side walls, a pivoted bottom having a rotary shaft mounted in opposite sides of the strainer, and a vertical slot formed in one of said sides and the corresponding end of said shaft being mounted in said slot, whereby said end of the shaft may be raised for the turning operation of the bottom.

4. A sink refuse strainer having a pivoted bottom for dumping the refuse therefrom, said bottom being perforated and provided with a transversely arranged rotary shaft for turning the bottom, said shaft being threaded through perforations in said bottom to hold it in fixed relation thereto.

5. A sink refuse strainer provided with a movable perforated bottom suitably mounted therein and adapted to be tipped on one edge so that the opposite swinging edge has considerable play within the strainer, and means for limiting the swinging movement of said bottom, whereby when the device is inverted for dumping, the bottom will automatically fall and thereby jar the refuse from the strainer and discharge it.

6. A sink refuse strainer provided with a swinging bottom mounted therein so as to be capable of being tipped on one part, the opposite swinging edge having considerable play within the strainer, the side of the strainer adjacent the swinging edge of the bottom being provided with a vertical slot, and a sliding connection between said bottom and slot for guiding and limiting the movements of the bottom.

7. A sink refuse strainer provided with a movable bottom operatively connected therewith having a limited play within the strainer whereby, upon inverting the device, the bottom will fall within the strainer and jar the refuse from it.

8. A sink refuse strainer provided with a movable bottom mounted therein so as to be capable of being tipped on one corner, the opposite swinging edge having considerable play within the strainer, said bottom also turning on an axis passing through said corner and opposite edge.

9. A sink refuse strainer provided with a swinging bottom mounted therein so as to be capable of being tipped on one part, the opposite swinging edge having considerable play within the strainer, and being slidably connected with the adjacent side of the strainer and having a limited sliding movement.

In witness whereof, I have hereunto set my hand in the presence of the two subscribing witnesses.

KATHERINE G. WILLIAMS.

Witnesses:
ELLA F. BRAMAN,
CLINTON R. WILLIAMS.